United States Patent Office 2,756,232
Patented July 24, 1956

2,756,232

SUBSTITUTED 1-CARBONYL-4-CARBAMYL PIPERAZINES AND METHOD OF PREPARING THE SAME

Leon Goldman, Nanuet, and Richard P. Williams, Westwood, N. J., assignors to American Cyanamid Company, New York, N. Y., a corporation of Maine No Drawing. Application February 16, 1954,
Serial No. 410,724

15 Claims. (Cl. 260—268)

This invention relates to a new class of organic compounds and more particularly, it relates to 1,4-unsymmetrically substituted piperazines and a method for their preparation.

The 1,4-unsymmetrically substituted piperazines of this invention may be illustrated by the following general formula:

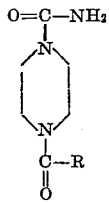

wherein R is a member selected from the group consisting of hydrogen atoms, lower alkyl carbonyl, aroyl, and chloro-aroyl radicals, such as for example, benzoyl, dichlorobenzoyl, o-chlorobenzoyl, acetyl, propionyl, n-butyryl.

The compounds of this invention are useful in the fields of chemistry, medicine and agriculture since they possess marked anti-convulsant activity.

The use of the carbobenzoxy radical as a blocking group for the preparation of 1,4-unsymmetrically substituted piperazines has not heretofore been disclosed. The carbethoxy group has previously been used for this purpose but it has a disadvantage in that the acid hydrolysis necessary for its removal is too drastic, thus making the desirable substituents on the alternate nitrogen vulnerable to hydrolysis. The benzyl group has also been used to block the nitrogen on the piperazine but it also has a disadvantage in that the yields of benzyl piperazine intermediates are unsatisfactorily low, and furthermore the benzyl group can only be removed by hydrogenolysis. In contradistinction to the aforementioned blocking groups, the carbobenzoxy radical is more versatile in that it can be removed by mild acid hydrolysis as well as hydrogenolysis and strong acid hydrolysis.

The compounds of this invention may be prepared by the decarbobenzoxylation of the corresponding piperazine derivative followed by acylation of the unsubstituted nitrogen. More specifically, the carbobenzoxypiperazine, dissolved in a suitable neutral or weakly acidic solvent, is treated with hydrogen in the presence of palladium-charcoal catalyst to obtain an N-substituted piperazine. The substituent on the $N^1$ or $N^4$ position (depending on the orientation selected) is non-functional and does not enter into the reaction. Various substituents may then be conveniently placed on the remaining unsubstituted nitrogen by several techniques, the most convenient being the use of acylating agents containing the desired substituents.

Any suitable solvent may be used for the decarbobenzoxylation but a neutral or weakly acidic medium is preferred such as for example, water, absolute alcohol, acetic acid, or 50% aqueous alcohol. If an alkaline medium is used, the salt of 4-carbamyl-1-piperazine-carboxylic acid is obtained, which must then be acidified prior to isolation of the decarbobenzoxylated product.

The following examples are presented to illustrate the specific embodiments of this invention but are not intended to limit the scope thereof.

Example I

A slurry of 65.8 gms. of 1-carbamyl-4-carbobenzoxy-piperazine and 6.6 gms. of 10% palladium on charcoal in 500 ml. of water was refluxed and stirred while passing in hydrogen. When the reduction was complete (no further evolution of carbon dioxide) the mixture was filtered to give a clear solution of 1-carbamylpiperazine.

Example II

An aqueous solution of 1-carbamylpiperazine free base prepared as in Example I from 65.8 grams of 1-carbamyl-4-carbobenzoxypiperazine was chilled to 5° C., and 35 grams of benzoyl chloride and 85 ml. of 4 N sodium hydroxide solution were added simultaneously with vigorous stirring over the course of 30 minutes. The reaction mixture was adjusted to pH 12, warmed to 25° C., and then cooled to 5° C. At this point 7 gms. of a by-product melting at 156–173° C. was removed by filtration. The filtrate was concentrated to dryness under reduced pressure at 25° C., and the dry residue was extracted with hot absolute ethanol. The ethanolic extract was concentrated to give 44 gms. of colorless crystals of 1-benzoyl-4-carbamylpiperazine, M. P. 176–182° C. Recrystallization from water gave 27.2 gms. of colorless crystals melting at 187.0–187.5° C.

Example III

To a solution of 33.1 gms, of 1-carbamylpiperazine in 200 ml. of 50% aqueous dioxane and 50 ml. of 4 N aqueous sodium hydroxide solution, 41.8 gms. of 2,6-dichlorobenzoyl chloride and 50 ml. of 4 N aqueous sodium hydroxide solution were added drop-wise with cooling at such a rate that the pH of the mixture was maintained at 9–10. The colorless precipitate which formed was removed by filtration, washed with water, and dried. The yield of pure 1-(2,6-dichlorobenzoyl)-4-carbamyl-piperazine was 52.6 gms. melting at 213–214° C.

Example IV

A solution of 1-carbamylpiperazine was prepared as follows: To a solution of 41.3 gms. of 1-carbamylpiperazine hydrochloride, 41.8 ml. of 6 N aqueous sodium hydroxide solution was added with cooling and stirring. The final pH was 12. The water was removed under reduced pressure at 20–25° C., leaving a partly crystalline residue which was slurried with 300 ml. of glacial acetic acid and filtered to remove 9.2 gms. of sodium chloride crystals. The filtrate, containing 1-carbamylpiperazine, was chilled, and 28.2 gms. of acetic anhydride was added drop-wise with stirring at 15° C. After removing an additional 3.7 gms. of sodium chloride crystals by filtration, the solvent was removed under reduced pressure leaving a crystalline residue. Recrystallization from a mixture of ethyl acetate and glacial acetic acid gave two crops of colorless crystals:

1st crop—24.8 gms. melting at 191–192° C.
2nd crop—12.6 gms. melting at 183–185° C.

Recrystallization of the first crop from isopropanol-water solution gave 20.4 gms. of colorless crystals melting at 192.5–193° C.

Example V

To a 100 ml. solution of 43 gms, of 1-carbamylpiperazine in dimethylformamide, 43.3 gms. of propionic anhydride was added while keeping the mixture cool by means of an ice bath. The reaction mixture was then allowed to come up to room temperature for several hours, after which time the mixture was chilled, and 52.5 gms. of crude product melting at 200–203° C. was removed by filtration. Recrystallization from absolute ethanol gave 39.4 gms. of 1-propionyl-4-carbamylpiperazine, M. P. 209–210° C.

*Example VI*

To a solution of 33.1 gms. of 1-carbamylpiperazine hydrochloride in 200 ml. of 50% aqueous dioxane and 50 ml. of 4 N aqueous sodium hydroxide solution, 35.0 gms. of o-chlorobenzoyl chloride and 50 ml. of 4 N aqueous sodium hydroxide solution were added dropwise with cooling at such a rate that the pH of the mixture was maintained at 9–10. The colorless precipitate which formed was removed by filtration, washed with water, and dried. The yield was 46.5 gms. of product melting at 230–231° C. Recrystallization from methanol gave 33.9 gms. of colorless crystals of 1-(o-chlorobenzoyl)-4-carbamylpiperazine, melting at 231–232° C.

We claim:

1. Compounds selected from the group consisting of those having the general formula

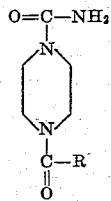

wherein R is a member selected from the group consisting of hydrogen, lower alkyl, phenyl, chlorophenyl and dichlorophenyl radicals.

2. The 1-dichlorobenzoyl-4-carbamylpiperazines.
3. The 1-lower-alkyl-carbonyl-4-carbamylpiperazines.
4. 1-benzoyl-4-carbamylpiperazine.
5. 1-(2,6-dichlorobenzoyl)-4-carbamylpiperazine.
6. 1-acetyl-4-carbamylpiperazine.
7. 1-propionyl-4-carbamylpiperazine.
8. o-Chlorobenzoyl-4-carbamylpiperazine.
9. A method for preparing compounds selected from the group consisting of those having the general formula

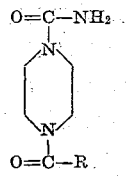

wherein R is a member selected from the group consisting of hydrogen, lower alkyl, phenyl, chlorophenyl and dichlorophenyl radicals which comprises treating a compound of the type

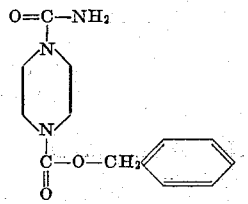

with hydrogen and palladium-charcoal catalyst and then treating the resulting compound with a member selected from the group consisting of benzoyl chloride, chlorobenzoyl chloride, dichlorobenzoyl chloride, and lower fatty acid anhydrides.

10. In a method for preparing compounds selected from the group consisting of those having the general formula

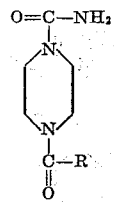

wherein R is a member selected from the group consisting of hydrogen, lower alkyl, phenyl, chlorophenyl, and dichlorophenyl radicals; the step of hydrogenolytically cleaving 1-carbobenzoxy-4-carbamyl piperazine with hydrogen and a palladium-charcoal catalyst.

11. In a method for preparing 1-benzoyl-4-carbamylpiperazine, the step of treating 1-carbamylpiperazine with benzoyl chloride.

12. In a method for preparing 1-carbamyl-4-(2,6-dichlorobenzoyl) piperazine, the step of treating 1-carbamylpiperazine with 2,6-dichlorobenzoyl chloride.

13. In a method for preparing 1-carbamyl-4-(o-chlorobenzoyl) piperazine, the step of treating 1-carbamylpiperazine with o-chlorobenzoyl chloride.

14. In a method for preparing 1-acetyl-4-carbamylpiperazine, the step of treating 1-carbamylpiperazine with acetic anhydride.

15. In a method for preparing 1-carbamyl-4-propionyl piperazine, the step of treating 1-carbamylpiperazine with propionic anhydride.

No references cited.